(12) United States Patent
Li et al.

(10) Patent No.: US 12,509,750 B2
(45) Date of Patent: Dec. 30, 2025

(54) RARE EARTH MAGNESIUM ALLOY BASED ON HIGH-TEMPERATURE AND HIGH-PRESSURE HYDROGENATION AND PREPARATION METHOD

(71) Applicant: SHANGHAI JIAO TONG UNIVERSITY, Shanghai (CN)

(72) Inventors: Yangxin Li, Shanghai (CN); Yang Su, Shanghai (CN); Xiaoqin Zeng, Shanghai (CN); Liping Zhou, Shanghai (CN); Tao Ying, Shanghai (CN); Zhao Shen, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 19/230,001

(22) Filed: Jun. 5, 2025

(65) Prior Publication Data
US 2025/0297343 A1    Sep. 25, 2025

(30) Foreign Application Priority Data
Oct. 24, 2024    (CN) .......................... 202411487040.3

(51) Int. Cl.
*C22C 23/06*    (2006.01)
*C22C 1/02*    (2006.01)
*G21F 1/08*    (2006.01)

(52) U.S. Cl.
CPC ................ *C22C 23/06* (2013.01); *C22C 1/02* (2013.01); *G21F 1/08* (2013.01)

(58) Field of Classification Search
None
See application file for complete search history.

(56) References Cited

FOREIGN PATENT DOCUMENTS

| CH | 667882 A5 | 11/1988 |
|---|---|---|
| CN | 102534330 A * | 7/2012 |

(Continued)

OTHER PUBLICATIONS

CN 112251621 A to Wu, Luoyi et al., issued Jan. 22, 2021, English Machine translation, 19 pages.

(Continued)

*Primary Examiner* — Brian D Walck
(74) *Attorney, Agent, or Firm* — Addison D. Ault; IPGentleman Intellectual Property Services, LLC

(57) ABSTRACT

Provided is a rare earth magnesium alloy based on high-temperature and high-pressure hydrogenation and a preparation method thereof, which belongs to the technical field of alloy materials. In the present disclosure, a microstructure of a rare earth magnesium alloy is regulated based on high-temperature and high-pressure hydrogenation to significantly improve the plasticity of the rare earth magnesium alloy. A similar microstructure can also be achieved in other high-gadolinium (Gd) and high-yttrium (Y) systems. The present disclosure provides a unique approach to enhance the plasticity of a magnesium alloy, and makes it more likely to regulate the mechanical properties of such a rare earth alloy subsequently through other deformation processes. The rare earth magnesium alloy based on high-temperature and high-pressure hydrogenation can be used for neutron-shielding, and is a material with a structure-function integrated design that can be used in the nuclear energy field and space field.

4 Claims, 7 Drawing Sheets

(56) References Cited

FOREIGN PATENT DOCUMENTS

| | | | | |
|---|---|---|---|---|
| CN | 103484742 A | | 1/2014 | |
| CN | 112251621 A | * | 1/2021 | ............. C22C 23/06 |
| CN | 115161504 A | | 10/2022 | |
| CN | 116043083 A | | 5/2023 | |
| CN | 118064774 A | | 5/2024 | |
| CN | 118360530 A | | 7/2024 | |
| CN | 118441184 A | | 8/2024 | |

OTHER PUBLICATIONS

CN 102534330 A to Dai, Jichun et al., Issued Jul. 4, 2012; English Machine translation, 14 pages.
CN 118441184 A to Dunn, Tim et al., Issued Aug. 6, 2024; English Abstract, 1 page.
CN 118360530 A to Ma, Shuwang et al., Issued Jul. 19, 2024; English Abstract, 1 page.
CN 118064774 A to Wang, Ke et al., Issued May 24, 2024; English Abstract, 1 page.
CN 116043083 A to Xu, Shao, et al., issued May 2, 2023; English Abstract, 1 page.
CN 11516504 A to Doug, Zhihuan et al., Issued Oct. 11, 2022; English Abstract, 1 page.
CN 103484742 A to Fu, Penghuai., Issueed Jan. 1, 2014; English Abstract, 1 page.
CNIPA Office Action, Application No. 202411487040.3, 'Notice of First Examinaiton Opinion' dated Dec. 19, 2024, Chinese original, pp. 1-8.
CNIPA Office Action, Application No, 202411487040.3, 'Notice of First Examination Opinion' dated Dec. 19, 2024; English translation, pp. 1-10.

* cited by examiner

RARE EARTH MAGNESIUM ALLOY BASED ON HIGH-TEMPERATURE AND HIGH-PRESSURE HYDROGENATION AND PREPARATION METHOD

CROSS-REFERENCE TO RELATED APPLICATIONS

This application claims priority to the Chinese Patent Application No. 2024114870403, filed on Oct. 24, 2024, the contents of which are hereby incorporated by reference.

TECHNICAL FIELD

The present disclosure relates to the technical field of alloy materials, and in particular, to a rare earth magnesium alloy based on high-temperature and high-pressure hydrogenation and a preparation method thereof.

BACKGROUND

Magnesium alloy, as the lightest structural metallic material currently available, has extensive application prospects in fields such as aerospace, national defense and military industry, and 3C digital products.

The current research and application of many high-strength magnesium alloys focus on the addition of gadolinium (Gd) and yttrium (Y), two rare earth elements. However, magnesium alloys with these two rare earth elements exhibit poor ductility either in a cast state or a deformed state (under extrusion, rolling, rotary swaging, etc.). This phenomenon is mainly attributed to the following reason: there are large-sized rigid and brittle second phases of rare earth elements in these magnesium alloys, such as $Mg_{24}(Gd, Y)_5$ and $Al_2(Gd, Y)$ produced after the addition of aluminum (Al), and cracks are easily formed near these second phases, resulting in the decrease of plasticity for these magnesium alloys. Therefore, the development of high-plasticity rare earth magnesium alloy materials and preparation methods thereof are currently a critical issue urgently to be solved in the industry.

In the present disclosure, a microstructure of a rare earth magnesium alloy is regulated based on high-temperature and high-pressure hydrogenation to significantly improve the plasticity of the rare earth magnesium alloy. A similar microstructure can also be achieved in other high-gadolinium (Gd) and high-yttrium (Y) systems. The present disclosure provides a unique approach to enhance the plasticity of a magnesium alloy and makes it more likely to regulate the mechanical properties of such a rare earth alloy subsequently through other deformation processes.

Traditional neutron-shielding materials are commonly faced with problems such as large weight (such as boron steel and boron-aluminum alloy) and poor strength and ductility (such as borates and lithium hydride). While optimizing the mechanical properties of a material through hydrogenation-deformation processing, the present disclosure can provide a certain neutron-shielding performance due to the presence of hydrogen (H) and gadolinium (Gd) in the material.

The rare earth magnesium alloy based on high-temperature and high-pressure hydrogenation provided in the present disclosure has certain mechanical properties and can be used for shielding neutron at the same time. As a result, the rare earth magnesium alloy provided in the present disclosure can be used as a material with a structure-function integrated design in the nuclear energy field and space field.

SUMMARY

The present disclosure provides a rare earth magnesium alloy based on high-temperature and high-pressure hydrogenation and a preparation method thereof to solve the technical problem that the rare earth magnesium alloy in the prior art has low plasticity.

In a first aspect, the present disclosure provides a rare earth magnesium alloy based on high-temperature and high-pressure hydrogenation, including the following elements in mass percentages: 0 wt % to 23.5 wt % of gadolinium, 0 wt % to 12.5 wt % of yttrium, 0.1 wt % to 3 wt % of aluminum, and the balance of magnesium and unavoidable impurities, wherein the rare earth magnesium alloy based on high-temperature and high-pressure hydrogenation includes at least one of gadolinium and yttrium.

According to the rare earth magnesium alloy based on high-temperature and high-pressure hydrogenation provided in the present disclosure, in mass percentages, the unavoidable impurities are as follows: less than or equal to 0.01 wt % of iron, less than or equal to 0.0054 wt % of nickel, and less than or equal to 0.005 wt % of copper.

In a second aspect, the present disclosure further provides a preparation method of a rare earth magnesium alloy based on high-temperature and high-pressure hydrogenation, including the following steps:

(1) according to an elemental composition of the rare earth magnesium alloy, weighing and preheating pure magnesium, pure aluminum, a Mg-30Gd master alloy, and a Mg-30Y master alloy;

(2) under protection of a mixed gas, raising a furnace temperature to melt the pure magnesium to obtain molten magnesium;

(3) under protection of mixed gas, raising the furnace temperature, adding the Mg-30Gd master alloy, the Mg-30Y master alloy, and the pure aluminum successively to the molten magnesium, skimming dross off, stirring, and allowing heat preservation to obtain a mixed melt;

(4) under protection of mixed gas, lowering the furnace temperature, skimming the surface dross off, and adding a refining agent to the mixed melt to obtain a rare earth magnesium alloy melt;

(5) under protection of mixed gas, raising the furnace temperature, allowing static heat preservation, and skimming the surface dross off to obtain a purified rare earth magnesium alloy melt;

(6) under protection of mixed gas, lowering the furnace temperature, and when the purified rare earth magnesium alloy melt is cooled to a casting temperature, skimming the surface dross off and casting the purified rare earth magnesium alloy melt into a preheated mold to obtain a rare earth magnesium alloy ingot; and (7) cutting the open shrinkage and surface oxide scale off from the rare earth magnesium alloy ingot, and conducting a hydrogenation treatment in a hydrogenation reactor to obtain the rare earth magnesium alloy based on the high-temperature and high-pressure hydrogenation.

According to the preparation method of a rare earth magnesium alloy based on high-temperature and high-pressure hydrogenation provided in the present disclosure, the mixed gas in the steps (2), (3), (4), and (5) each is mixed gas of $SF_6$ and $CO_2$ in 1: (48-52).

According to the preparation method of a rare earth magnesium alloy based on high-temperature and high-pressure hydrogenation provided in the present disclosure, in the step (1), the preheating is conducted at 190° C. to 210° C.; in the step (2), the furnace temperature is raised to 730° C. to 750° C.; in the step (3), the furnace temperature is raised to 750° C. to 770° C.; in the step (4), the furnace temperature is raised to 730° C. to 750° C.; in the step (5), the furnace temperature is raised to 750° C. to 770° C.; in the step (6), the furnace temperature is lowered to 720° C. to 740° C., and during the casting, the purified rare earth magnesium alloy melt is at a temperature of 710° C. to 730° C. and the mold is preheated to 190° C. to 210° C.

According to the preparation method of a rare earth magnesium alloy based on high-temperature and high-pressure hydrogenation provided in the present disclosure, in the step (3), the heat preservation is allowed for 10 min to 20 min.

According to the preparation method of a rare earth magnesium alloy based on high-temperature and high-pressure hydrogenation provided in the present disclosure, in the step (5), the static heat preservation is allowed for 10 min to 15 min.

According to the preparation method of a rare earth magnesium alloy based on high-temperature and high-pressure hydrogenation provided in the present disclosure, in the step (4), the refining agent is JDMJ, and the amount of the refining agent is 1.5% to 2.5% of a total mass of the rare earth magnesium alloy based on high-temperature and high-pressure hydrogenation.

According to the preparation method of a rare earth magnesium alloy based on high-temperature and high-pressure hydrogenation provided in the present disclosure, in the step (4), the refining agent is added in three times at an interval of 2 min to 5 min under stirring.

According to the preparation method of a rare earth magnesium alloy based on high-temperature and high-pressure hydrogenation provided in the present disclosure, in the step (7), the hydrogenation treatment is conducted for 35 h to 45 h at a temperature of 480° C. to 520° C. and a pressure of 0.5 MPa to 10 MPa.

In the rare earth magnesium alloy based on high-temperature and high-pressure hydrogenation and the preparation method thereof provided by the present disclosure, through a hydrogenation process, the original large-sized second phase of a rare earth element can be refined into a fine rare earth hydride, which can adapt to larger deformation. The present disclosure solves the technical problem that the rare earth magnesium alloy in the prior art exhibits poor ductility and is prone to cracks, and allows the beneficial effect of greatly improving the plasticity of a rare earth magnesium alloy. The rare earth magnesium alloy based on high-temperature and high-pressure hydrogenation provided in the present disclosure can be used for neutron-shielding, and is a material with a structure-function integrated design that can be used in the nuclear energy field and space field.

BRIEF DESCRIPTION OF THE DRAWINGS

To describe the technical solutions in the present disclosure or in the prior art clearly, the accompanying drawings required in the description of the embodiments, or the prior art are briefly described below. Apparently, the accompanying drawings in the following description show some embodiments of the present disclosure, and those of ordinary skill in the art may still derive other accompanying drawings from these accompanying drawings without creative efforts.

DETAILED DESCRIPTION OF THE EMBODIMENTS

In order to make the objectives, technical solutions, and advantages of the present disclosure clear, the technical solutions of the present disclosure will be clearly and completely described below with reference to the accompanying drawings of the present disclosure. Apparently, the embodiments described are some rather than all of the embodiments of the present disclosure. All other embodiments obtained by those of ordinary skill in the art based on the embodiments of the present disclosure without creative efforts shall fall within the protection scope of the present disclosure.

The present disclosure is described below with reference to FIG. 1 to FIG. 7.

Figure 1:
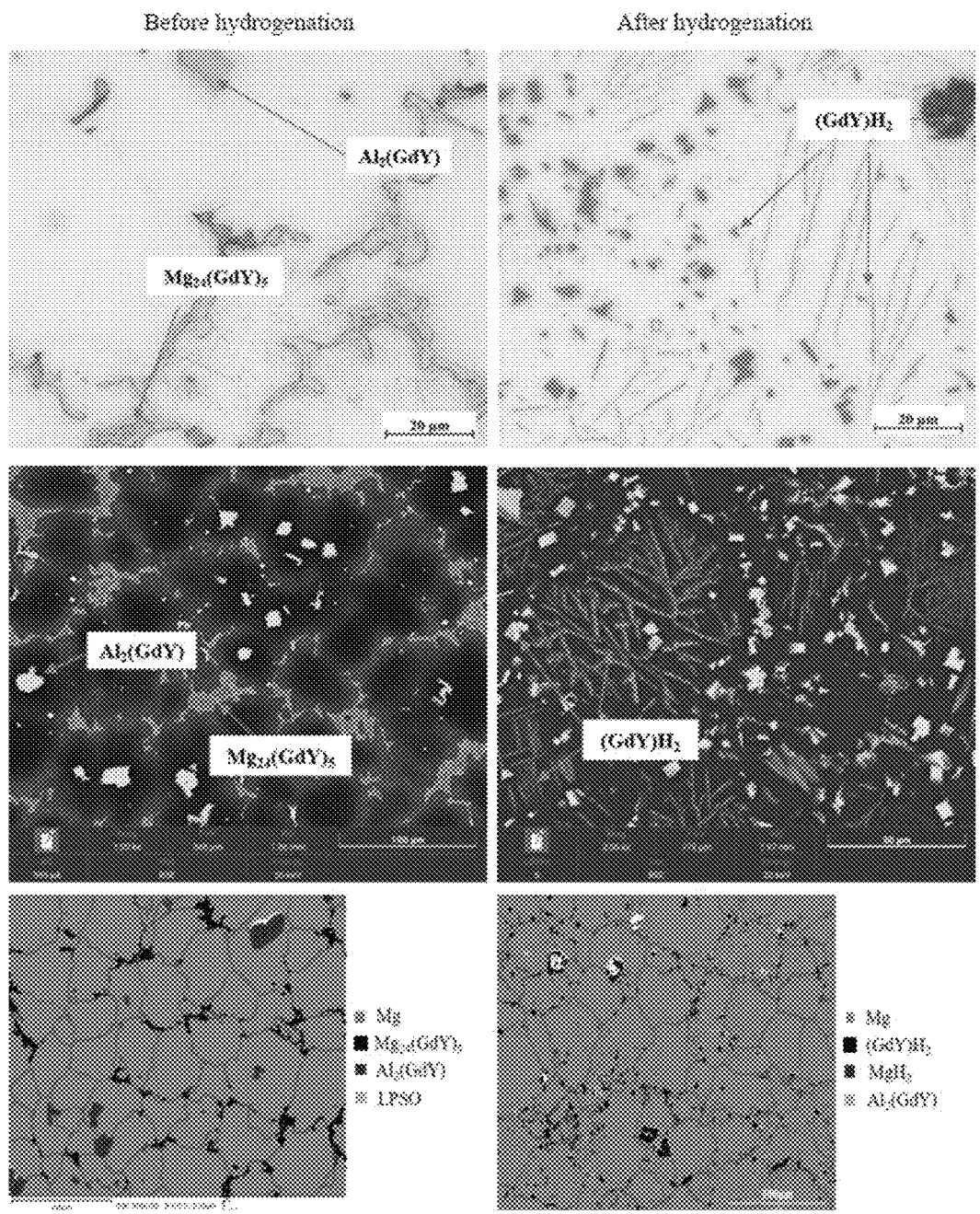
FIG. 1 shows the images of microstructure characterization for Example 4 of the present disclosure before and after a hydrogenation treatment.

FIG. 1 shows the images of microstructure characterization for Example 4 of the present disclosure before and after a hydrogenation treatment.

From top to bottom, the images in FIG. 1 show the microstructures under an optical microscope (OM), the microstructures under SEM, and the phase analysis conducted by electron backscatter diffraction (EBSD), respectively. It can be seen from the characterization of EBSD that, in contrast to a cast state (before hydrogenation), after hydrogenation, a microstructure represented by the green part ($Mg_{24}(Gd, Y)_5$) and a microstructure represented by the blue part ($Al_2(Gd, Y)$) completely disappear, and a microstructure of a rare earth hydride $(Gd, Y)H_2$ represented by the green part is produced.

Figure 2:
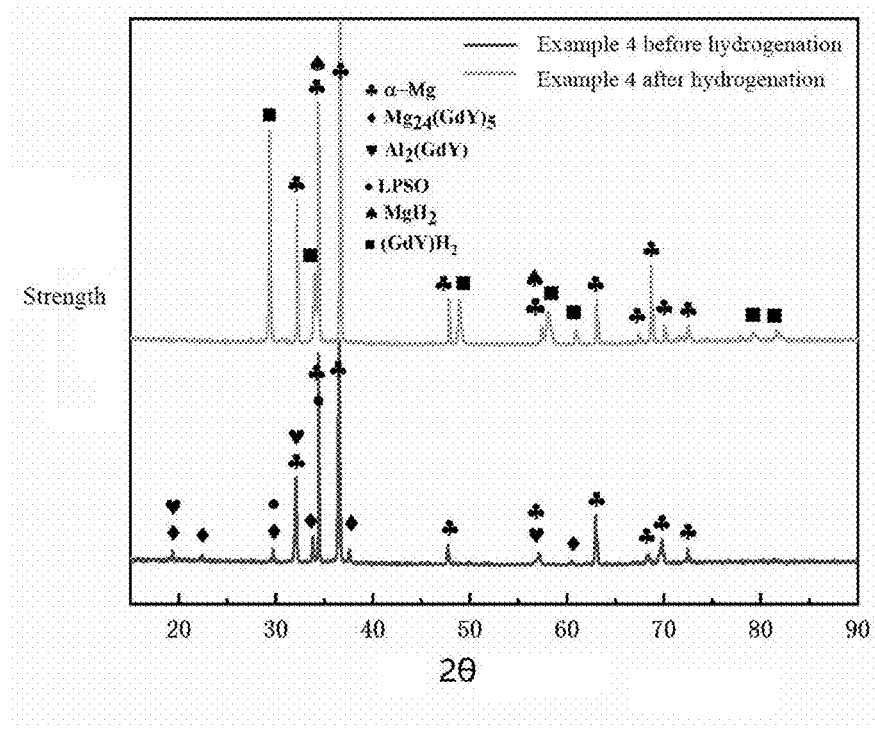
FIG. 2 shows the X-ray diffraction (XRD) patterns for Example 4 of the present disclosure before and after a hydrogenation treatment.

FIG. 2 shows the XRD patterns for Example 4 of the present disclosure before and after a hydrogenation treatment.

As shown in FIG. 2, the magnesium alloy is transformed into a hydrogenated state after a hydrogenation treatment.

Figure 3:
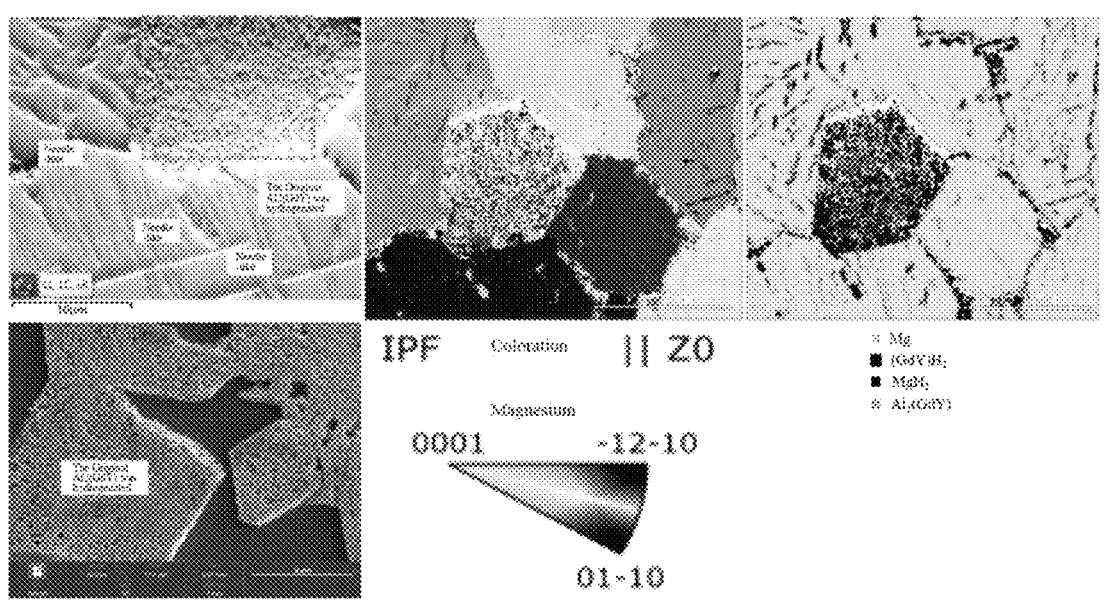
FIG. 3 shows the detailed characterization results of characteristic hydrides in Example 4 of the present disclosure.

FIG. 3 shows the detailed characterization results of characteristic hydrides in Example 4 of the present disclosure.

As shown in FIG. 3, the typical hydrides produced in a hydrogenated alloy are characterized. It has been found that the original $Al_2$(Gd, Y) is refined into fine rare earth hydrides with various orientations, and the refined microstructure produced after a hydrogenation treatment contributes a lot to the plasticity of the alloy, which further confirms the phase changes during the hydrogenation treatment.

Figure 4:
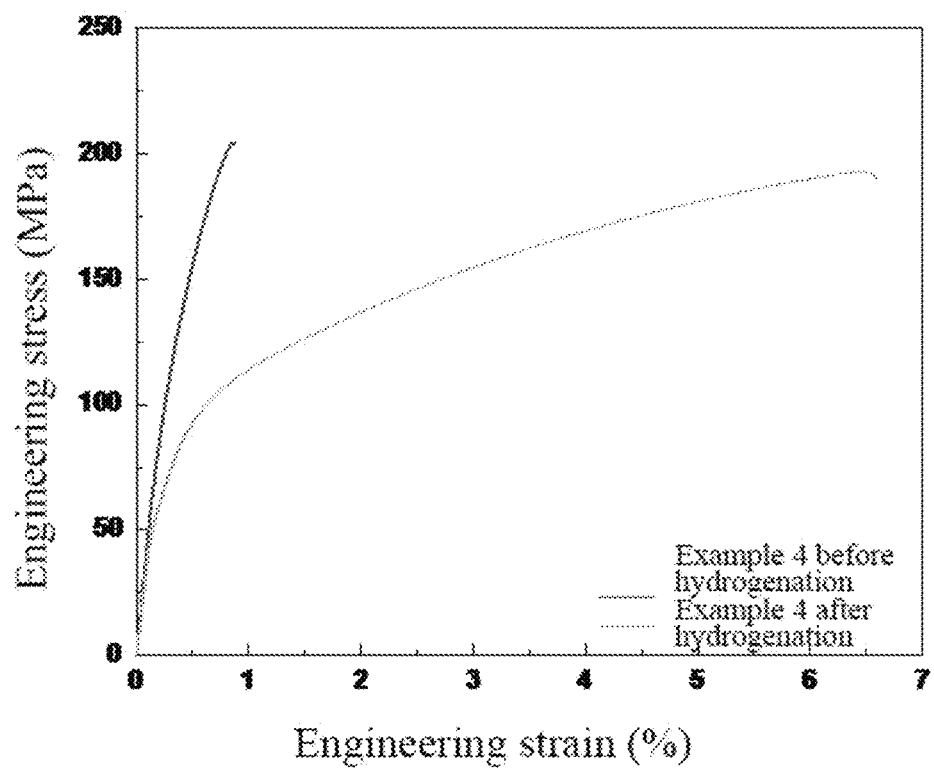
FIG. 4 shows the curve chart of tensile mechanics for a magnesium alloy in Example 4 of the present disclosure before and after a hydrogenation treatment.

FIG. 4 shows the curve chart of tensile mechanics for a magnesium alloy in Example 4 of the present disclosure before and after a hydrogenation treatment.

As shown in FIG. 4, an alloy after undergoing hydrogenation exhibits significantly higher plasticity than an alloy before undergoing hydrogenation.

Figure 5:
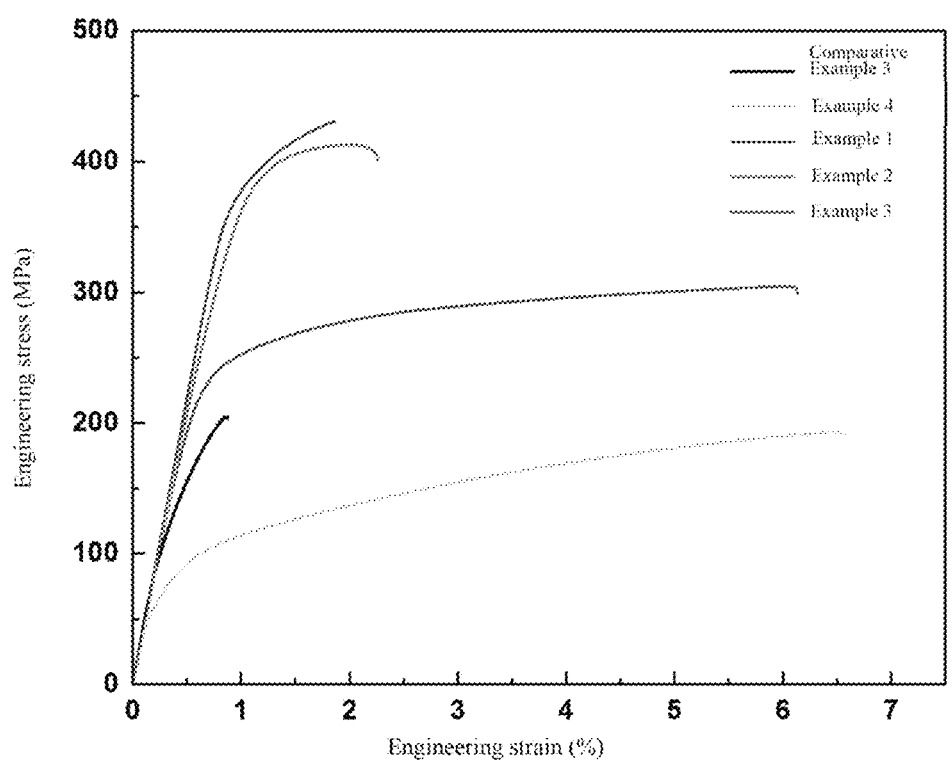
FIG. 5 shows the performance comparison for rare earth magnesium alloys based on high-temperature and high-pressure hydrogenation processed by different deformation techniques provided in the present disclosure.

FIG. 5 shows the performance comparison for rare earth magnesium alloys based on high-temperature and high-pressure hydrogenation processed by different deformation techniques provided in the embodiments of the present disclosure.

As shown in FIG. 5, a rare earth magnesium alloy based on high-temperature and high-pressure hydrogenation is extruded at 375° C. and 1.7 mm/s, further subjected to room-temperature rotary swaging, or forged at 300° C. and 0.005%/s under the as-hydrogenated state, and then compared with a hydrogenated alloy and a cast-state alloy for mechanical properties. It can be known that the processing by the different deformation techniques can further refine the crystal grains and improve the strength.

Figure 6:
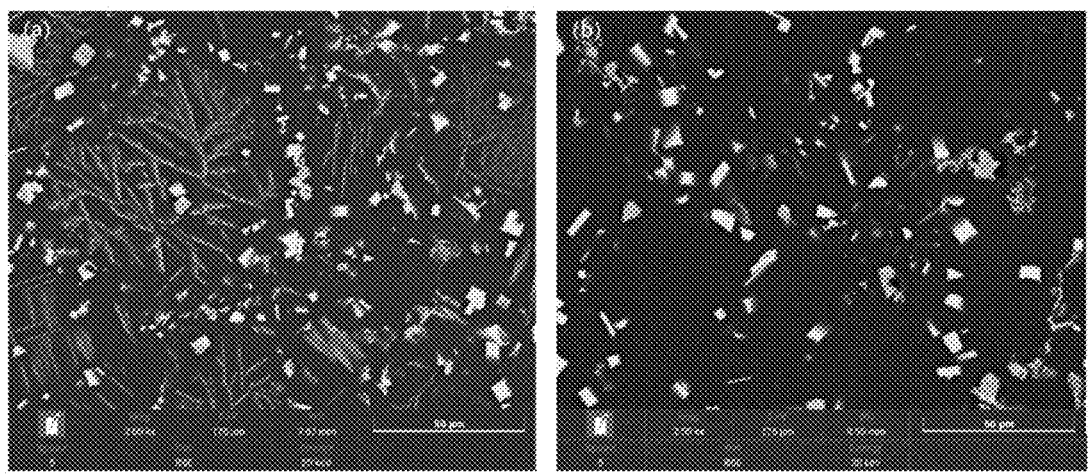
FIG. 6 shows the images of microstructures of rare earth magnesium alloys hydrogenated under different hydrogenation treatment parameters provided in the present disclosure that are acquired by a scanning electron microscope (SEM), wherein (a) shows a microstructure of Example 4 under SEM and (b) shows a microstructure of Example 5 under SEM.

FIG. 6 shows the images of microstructures of rare earth magnesium alloys hydrogenated under different hydrogenation treatment parameters provided in the present disclosure that are acquired by SEM, wherein (a) shows a microstructure of Example 4 under SEM and (b) shows a microstructure of Example 5 under SEM.

As shown in FIG. 6, Example 4 and Example 5 share the same alloy composition, but involve different hydrogenation parameters. Example 4 and Example 5 are significantly different from each other in terms of hydrides in a microstructure, and exhibit different mechanical properties. It indicates that a microstructure can be regulated by different hydrogenation processes to affect the mechanical properties of a material.

Figure 7:
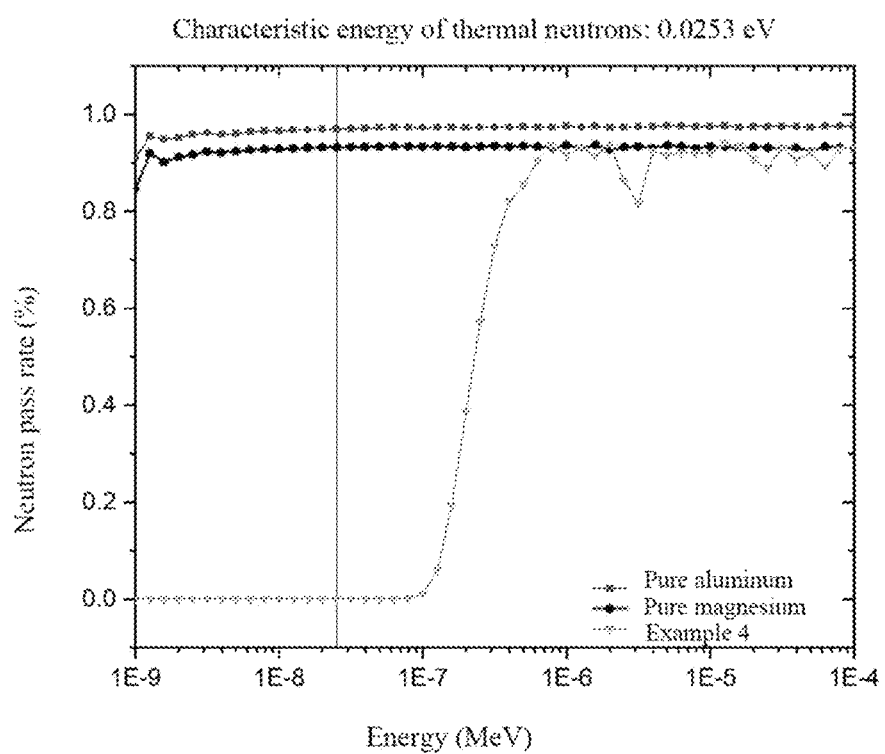
FIG. 7 shows the neutron-shielding performance of the pure aluminum and pure magnesium provided in the present disclosure and Example 4 of the present disclosure during Monte Carlo N-Particle (MCNP) simulation.

FIG. 7 shows the neutron-shielding performance of the pure aluminum and pure magnesium provided in the present disclosure and Example 4 of the present disclosure during MCNP simulation.

As shown in FIG. 7, the pure aluminum and pure magnesium exhibit no shielding effect for neutrons, but Example 4 of the present disclosure can effectively shield neutrons of 1E-7 MeV or less.

In the first aspect, the present disclosure provides a rare earth magnesium alloy based on high-temperature and high-pressure hydrogenation, including the following elements in mass percentages: 0 wt % to 23.5 wt % of gadolinium, 0 wt % to 12.5 wt % of yttrium, 0.1 wt % to 3 wt % of aluminum, and the balance of magnesium and unavoidable impurities. The rare earth magnesium alloy based on high-temperature and high-pressure hydrogenation includes at least one of gadolinium and yttrium, preferably includes 10 wt % to 20 wt % of gadolinium, 1 wt % to 10 wt % of yttrium, and 0.5 wt % to 2 wt % of aluminum, and further preferably includes 13 wt % to 17 wt % of gadolinium, 1.5 wt % to 5 wt % of yttrium, and 0.8 wt % to 1.2 wt % of aluminum.

According to the rare earth magnesium alloy based on high-temperature and high-pressure hydrogenation provided in the present disclosure, in mass percentages, the unavoidable impurities are as follows: less than or equal to 0.01 wt % of iron, less than or equal to 0.0054 wt % of nickel, and less than or equal to 0.005 wt % of copper.

In the second aspect, the present disclosure further provides a preparation method of a rare earth magnesium alloy based on high-temperature and high-pressure hydrogenation, including the following steps:

(1) According to an elemental composition of the rare earth magnesium alloy, pure magnesium, pure aluminum, a Mg-30Gd master alloy, and a Mg-30Y master alloy are weighed and preheated.

(2) Under protection of mixed gas, the furnace temperature is raised to melt the pure magnesium to obtain molten magnesium.

(3) Under protection of mixed gas, the furnace temperature is raised, the Mg-30Gd master alloy, the Mg-30Y master alloy, and the pure aluminum are added successively to the molten magnesium, surface dross is skimmed off, and stirring and heat preservation are conducted to obtain a mixed melt.

(4) Under protection of mixed gas, the furnace temperature is lowered, surface dross is skimmed off, and a refining agent is added to the mixed melt to obtain a rare earth magnesium alloy melt.

(5) Under protection of mixed gas, the furnace temperature is raised, static heat preservation is allowed, and surface dross is skimmed off to obtain a purified rare earth magnesium alloy melt.

(6) Under protection of mixed gas, the furnace temperature is lowered, and when the purified rare earth magnesium alloy melt is cooled to a casting temperature, surface dross is skimmed off and the purified rare earth magnesium alloy melt is cast into a preheated mold to obtain a rare earth magnesium alloy ingot.

(7) An open shrinkage and a surface oxide scale are cut off from the rare earth magnesium alloy ingot, and a hydrogenation treatment is conducted in a hydrogenation reactor to obtain the rare earth magnesium alloy based on high-temperature and high-pressure hydrogenation.

According to the preparation method of a rare earth magnesium alloy based on high-temperature and high-pressure hydrogenation provided in the present disclosure, the mixed gas in the steps (2), (3), (4), and (5) each is mixed gas of $SF_6$ and $CO_2$ in 1: (48-52), preferably 1: (49-51), and further preferably 1:50.

According to the preparation method of a rare earth magnesium alloy based on high-temperature and high-pressure hydrogenation provided in the present disclosure, in the step (1), the preheating is conducted at 190° C. to 210° C., preferably 195° C. to 205° C., and further preferably 198° C. to 202° C. In the step (2), the furnace temperature is raised to 730° C. to 750° C., preferably 735° C. to 745° C., and further preferably 738° C. to 742° C. In the step (3), the furnace temperature is raised to 750° C. to 770° C., preferably 755° C. to 765° C., and further preferably 758° C. to 762° C. In the step (4), the furnace temperature is raised to 730° C. to 750° C., preferably 735° C. to 745° C., and further preferably 738° C. to 742° C. In the step (5), the furnace temperature is raised to 750° C. to 770° C., preferably 755° C. to 765° C., and further preferably 758° C. to 762° C. In the step (6), the furnace temperature is lowered to 720° C. to 740° C., preferably 725° C. to 735° C., and further preferably 728° C. to 732° C. During the casting, the purified rare earth magnesium alloy melt is at a temperature of 710° C. to 730° C., preferably 715° C. to 725° C., and further preferably 718° C. to 722° C., and the mold is preheated to 190° C. to 210° C., preferably 195° C. to 205° C., and further preferably 198° C. to 202° C.

According to the preparation method of a rare earth magnesium alloy based on high-temperature and high-pressure hydrogenation provided in the present disclosure, in the step (3), the heat preservation is allowed for 10 min to 20 min, preferably 12 min to 18 min, and further preferably 14 min to 16 min.

According to the preparation method of a rare earth magnesium alloy based on high-temperature and high-pressure hydrogenation provided in the present disclosure, in the step (5), the static heat preservation is allowed for 10 min to 15 min and preferably 12 min to 14 min.

According to the preparation method of a rare earth magnesium alloy based on high-temperature and high-pressure hydrogenation provided in the present disclosure, in the step (4), the refining agent is JDMJ, and an amount of the refining agent is 1.5% to 2.5% of a total mass of the rare earth magnesium alloy based on high-temperature and high-pressure hydrogenation.

According to the preparation method of a rare earth magnesium alloy based on high-temperature and high-pressure hydrogenation provided in the present disclosure, in the step (4), the refining agent is added in three times at an interval of 2 min to 5 min under stirring.

According to the preparation method of a rare earth magnesium alloy based on high-temperature and high-pressure hydrogenation provided in the present disclosure, in the step (7), the hydrogenation treatment is conducted at a temperature of 480° C. to 520° C., preferably 490° C. to 510° C., and further preferably 495° C. to 505° C., the hydrogenation treatment is conducted under a pressure of 0.5 MPa to 10 MPa, preferably 1 MPa to 4 MPa, and further preferably 2 MPa to 3 MPa, and the hydrogenation treatment is conducted for 35 h to 45 h, preferably 37 h to 43 h, and further preferably 39 h to 41 h.

After a hydrogenation treatment, deformation techniques such as medium-temperature low-speed forging, medium-temperature low-speed extrusion, and rotary swaging can be applied according to actual needs to further regulate the microstructure and mechanical properties. A deformation technique can be freely designed according to different requirements. After a hydrogenation treatment, the plasticity of a rare earth magnesium alloy is significantly enhanced, which allows ample processing flexibility for various deformation techniques.

Example 1

1,684 g of pure magnesium, 91.8 g of pure aluminum, 4,000 g of a Mg-30Gd master alloy, and 860 g of a Mg-30Y master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium, the furnace temperature was raised to 760° C., and the Mg-30Gd master alloy, the Mg-30Y master alloy, and the pure aluminum were added successively. Surface dross was skimmed off, stirring was conducted, and heat preservation was conducted for 15 min to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 15.12 wt %, Y: 2.61 wt %, and Al: 1.18 wt %; unavoidable impurities: Fe: 0.0020 wt %, Ni: 0.001 wt %, and Cu: 0.0015 wt %; and Mg: the balance.

An open shrinkage and a surface oxide scale were cut off from the rare earth magnesium alloy ingot, and a hydrogenation treatment was conducted in a hydrogenation reactor at 500° C. and 2 MPa for 40 h to obtain a rare earth magnesium alloy based on high-temperature and high-pressure hydrogenation. It was tested that, after the hydrogenation treatment, a concentration of adsorbed hydrogen was H 0.5193 wt %.

The rare earth magnesium alloy based on high-temperature and high-pressure hydrogenation was heated to 375° C. and extruded into a rod at a rate of 1.7 mm/s.

It was tested that the rare earth magnesium alloy based on high-temperature and high-pressure hydrogenation in this example had a tensile strength of 420.0 MPa and an elongation at break of 1.6%.

Example 2

1,684 g of pure magnesium, 91.8 g of pure aluminum, 4,000 g of a Mg-30Gd master alloy, and 860 g of a Mg-30Y master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium, the furnace temperature was raised to 760° C., and the Mg-30Gd master alloy, the Mg-30Y master alloy, and the pure aluminum were added successively. Surface dross was skimmed off, stirring was conducted, and heat preservation was conducted for 15 min to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 15.12 wt %, Y: 2.61 wt %, and Al: 1.18 wt %; unavoidable impurities: Fe: 0.0020 wt %, Ni: 0.001 wt %, and Cu: 0.0015 wt %; and Mg: the balance.

The open shrinkage and surface oxide scale were cut off from the rare earth magnesium alloy ingot, and a hydrogenation treatment was conducted in a hydrogenation reactor at 500° C. and 2 MPa for 40 h to obtain a rare earth magnesium alloy based on high-temperature and high-pressure hydrogenation. It was tested that, after the hydrogenation treatment, a concentration of adsorbed hydrogen was H 0.5193 wt %.

The rare earth magnesium alloy based on high-temperature and high-pressure hydrogenation was heated to 375° C. and extruded into a rod at a rate of 1.7 mm/s, and then subjected to room-temperature rotary swaging.

It was tested that the rare earth magnesium alloy based on high-temperature and high-pressure hydrogenation in this example had a tensile strength of 413.7 MPa and an elongation at break of 1.7%.

Example 3

1,684 g of pure magnesium, 91.8 g of pure aluminum, 4,000 g of a Mg-30Gd master alloy, and 860 g of a Mg-30Y master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium, the furnace temperature was raised to 760° C., and the Mg-30Gd master alloy, the Mg-30Y master alloy, and the pure aluminum were added successively. Surface dross was skimmed off, stirring was conducted, and heat preservation was conducted for 15 min to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 15.12 wt %, Y: 2.61 wt %, and Al: 1.18 wt %; unavoidable impurities: Fe: 0.0020 wt %, Ni: 0.001 wt %, and Cu: 0.0015 wt %; and Mg: the balance.

The open shrinkage and surface oxide scale were cut off from the rare earth magnesium alloy ingot, and a hydrogenation treatment was conducted in a hydrogenation reactor at 500° C. and 2 MPa for 40 h to obtain a rare earth magnesium alloy based on high-temperature and high-pressure hydrogenation. It was tested that, after the hydrogenation treatment, a concentration of adsorbed hydrogen was H 0.5193 wt %.

The rare earth magnesium alloy based on high-temperature and high-pressure hydrogenation was heated to 300° C. and forged at a rate of 0.005%/s, with a final deformation of 80%.

It was tested that the rare earth magnesium alloy based on high-temperature and high-pressure hydrogenation in this example had a tensile strength of 299.2 MPa and an elongation at break of 5.1%.

Example 4

1,684 g of pure magnesium, 91.8 g of pure aluminum, 4,000 g of a Mg-30Gd master alloy, and 860 g of a Mg-30Y master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium, the furnace temperature was raised to 760° C., and the Mg-30Gd master alloy, the Mg-30Y master alloy, and the pure aluminum were added successively. Surface dross was skimmed off, stirring was conducted, and heat preservation was conducted for 15 min to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 15.20 wt %, Y: 2.42 wt %, and Al: 1.09 wt %; unavoidable impurities: Fe: 0.0018 wt %, Ni: 0.0013 wt %, and Cu: 0.0012 wt %; and Mg: the balance.

The open shrinkage and surface oxide scale were cut off from the rare earth magnesium alloy ingot, and a hydrogenation treatment was conducted in a hydrogenation reactor at 500° C. and 2 MPa for 40 h to obtain a rare earth magnesium alloy based on high-temperature and high-pressure hydrogenation. It was tested that, after the hydrogenation treatment, a concentration of adsorbed hydrogen was H 0.5193 wt %.

It was tested that the rare earth magnesium alloy based on high-temperature and high-pressure hydrogenation in this example had a tensile strength of 193.0 MPa and an elongation at break of 6.6% and could effectively shield neutrons of 1E-7 MeV or less.

Example 5

1,684 g of pure magnesium, 91.8 g of pure aluminum, 4,000 g of a Mg-30Gd master alloy, and 860 g of a Mg-30Y master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium, the furnace temperature was raised to 760° C., and the Mg-30Gd master alloy, the Mg-30Y master alloy, and the pure aluminum were added successively. Surface dross was skimmed off, stirring was conducted, and heat preservation was conducted for 15 min to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 15.20 wt %, Y: 2.42 wt %, and Al: 1.09 wt %; unavoidable impurities: Fe: 0.0018 wt %, Ni: 0.0013 wt %, and Cu: 0.0012 wt %; and Mg: the balance.

The open shrinkage and surface oxide scale were cut off from the rare earth magnesium alloy ingot, and a hydrogenation treatment was conducted in a hydrogenation reactor at 500° C. and 4 MPa for 40 h to obtain a rare earth magnesium alloy based on high-temperature and high-pressure hydrogenation. It was tested that, after the hydrogenation treatment, a concentration of adsorbed hydrogen was H 0.5779 wt %.

It was tested that the rare earth magnesium alloy based on high-temperature and high-pressure hydrogenation in this example had a tensile strength of 179.7 MPa and an elongation at break of 5.0%.

Comparative Example 1

3,090 g of pure magnesium, 3,200 g of a Mg-30Gd master alloy, and 125 g of a Mg-30Zr master alloy were weighed and preheated at 200° C.

Mixed gas of $SF_6$ and $CO_2$ in 1:50 was introduced for protection. A furnace temperature was raised to 740° C. to melt the pure magnesium to obtain molten magnesium. The furnace temperature was raised to 760° C., and the Mg-30Gd master alloy and the Mg-30Zr master alloy were added successively, heat preservation was allowed for 15 min, and surface dross was skimmed off to obtain a mixed melt. The furnace temperature was lowered to 740° C. Under stirring, a refining agent JDMJ was added in three times at an interval of 3 min to the mixed melt to obtain a rare earth magnesium alloy melt. The amount of the refining agent was 2% of a total mass of the rare earth magnesium alloy. The furnace temperature was raised to 760° C., static heat preservation was allowed for 13 min, and then surface dross was skimmed off to obtain a purified rare earth magnesium alloy melt. The furnace temperature was lowered to 730° C. When the purified rare earth magnesium alloy melt was cooled to 720° C., surface dross was skimmed off, and the purified rare earth magnesium alloy melt was cast into a mold preheated to 200° C. to obtain a rare earth magnesium alloy ingot. It was tested that chemical components of the rare earth magnesium alloy ingot were as follows: Gd: 11.92 wt % and Zr: 0.42 wt %; unavoidable impurities: Fe: 0.0012 wt %, Ni: 0.0008 wt %, and Cu: 0.0006 wt %; and Mg: the balance.

The open shrinkage and surface oxide scale were cut off from the rare earth magnesium alloy ingot, and a hydrogenation treatment was conducted in a hydrogenation reactor at 500° C. and 2 MPa for 40 h to obtain a rare earth magnesium alloy based on high-temperature and high-pressure hydrogenation. It was tested that, after the hydrogenation treatment, a concentration of adsorbed hydrogen was H 0.5021 wt %.

It was tested that the rare earth magnesium alloy based on high-temperature and high-pressure hydrogenation in this comparative example had a tensile strength of 203.3 MPa and an elongation at break of 4.4%.

Comparative Example 2

By the same preparation method as in Comparative Example 1, a magnesium alloy ingot was prepared without undergoing a hydrogenation treatment subsequently. Chemical components of the magnesium alloy ingot were as follows: Gd: 11.92 wt % and Zr: 0.42 wt %; unavoidable impurities: Fe: 0.0012 wt %, Ni: 0.0008 wt %, and Cu: 0.0006 wt %; and Mg: the balance.

It was tested that the magnesium alloy ingot in this comparative example had a tensile strength of 178.41 MPa and an elongation at break of 3.95%.

Comparative Example 3

By the same preparation method as in Example 4, a magnesium alloy ingot was prepared without undergoing a hydrogenation treatment subsequently. Chemical components of the magnesium alloy ingot were as follows: Gd: 15.20 wt %, Y: 2.42 wt %, and Al: 1.09 wt %; unavoidable impurities: Fe: 0.0018 wt %, Ni: 0.0013 wt %, and Cu: 0.0012 wt %; and Mg: the balance.

It was tested that the magnesium alloy ingot in this comparative example had a tensile strength of 204.90 MPa and an elongation at break of 0.88%.

According to the examples and comparative examples, Example 4 and Example 5 share the same alloy composition, but involve different hydrogenation treatment parameters. The corresponding products are significantly different from each other in terms of hydrides in a microstructure, and exhibit different mechanical properties. Examples 1 to 4 share the same alloy composition and the same hydrogenation treatment parameters, but involve different deformation techniques. The corresponding products have different mechanical properties. It can be seen that different deformation techniques after the hydrogenation treatment can further regulate the microstructure and mechanical properties. Example 4 and Comparative Example 1 have different alloy compositions, but involve the same hydrogenation treatment parameters. The corresponding products also have different mechanical properties. It can be seen that an alloy composition also has a significant impact on the mechanical properties of an alloy.

Finally, it should be noted that the above examples are intended merely to describe the technical solutions of the present disclosure, and are not intended to limit the present disclosure. Although the present disclosure is described in detail with reference to the above examples, those of ordinary skill in the art should understand that they can still modify the technical solutions described in the above examples, or make equivalent substitutions to some technical features therein. These modifications or substitutions do not make the essence of the corresponding technical solutions depart from the spirit and scope of the technical solutions of the examples of the present disclosure.

What is claimed is:

1. A preparation method of a rare earth magnesium alloy based on high-temperature and high-pressure hydrogenation, comprising the following steps:
   (1) according to an elemental composition of the rare earth magnesium alloy, weighing and preheating pure magnesium, pure aluminum, and at least one of a Mg-30Gd master alloy and a Mg-30Y master alloy;
   (2) under protection of mixed gas, raising a furnace temperature to melt the pure magnesium to obtain molten magnesium;
   (3) under protection of mixed gas, raising the furnace temperature, adding at least one of the Mg-30Gd master alloy and the Mg-30Y master alloy, and adding the pure aluminum successively to the molten magnesium, skimming dross off, stirring, and allowing heat preservation to obtain a mixed melt;
   (4) under protection of mixed gas, lowering the furnace temperature, skimming surface dross off, and adding a refining agent to the mixed melt to obtain a rare earth magnesium alloy melt;
   (5) under protection of mixed gas, raising the furnace temperature, allowing static heat preservation, and skimming surface dross off to obtain a purified rare earth magnesium alloy melt;

(6) under protection of mixed gas, lowering the furnace temperature, and when the purified rare earth magnesium alloy melt is cooled to a casting temperature, skimming surface dross off and casting the purified rare earth magnesium alloy melt into a preheated mold to obtain a rare earth magnesium alloy ingot; and (7) cutting the open shrinkage and surface oxide scale off from the rare earth magnesium alloy ingot, and conducting a hydrogenation treatment in a hydrogenation reactor to obtain the rare earth magnesium alloy based on the high-temperature and high-pressure hydrogenation, wherein in the step (1), the preheating is conducted at 190° C. to 210° C.;

in the step (2), the furnace temperature is raised to 730° C. to 750° C.;

in the step (3), the furnace temperature is raised to 750° C. to 770° C.;

in the step (4), the furnace temperature is lowered to 730° C. to 750° C.;

in the step (5), the furnace temperature is raised to 750° C. to 770° C.;

in the step (6), the furnace temperature is lowered to 720° C. to 740° C., and during the casting, the purified rare earth magnesium alloy melt is at a temperature of 710° C. to 730° C. and the mold is preheated to 190° C. to 210° C.;

in the step (7), the hydrogenation treatment is conducted for 35 h to 45 h at a temperature of 480° C. to 520° C. and a pressure of 0.5 MPa to 10 MPa;

in the step (3), the heat preservation is allowed for 10 min to 20 min;

in the step (5), the static heat preservation is allowed for 10 min to 15 min;

the rare earth magnesium alloy comprises the following elements in mass percentages:

0 wt % to 23.5 wt % of gadolinium;

0 wt % to 12.5 wt % of yttrium;

0.1 wt % to 3 wt % of aluminum; and the balance of magnesium and unavoidable impurities;

the rare earth magnesium alloy based on high-temperature and high-pressure hydrogenation comprises at least one of gadolinium and yttrium; and the unavoidable impurities in mass percentages are as follows:

less than or equal to 0.01 wt % of iron;

less than or equal to 0.0054 wt % of nickel; and less than or equal to 0.005 wt % of copper.

2. The preparation method of a rare earth magnesium alloy based on high-temperature and high-pressure hydrogenation according to claim 1, wherein the mixed gas in the steps (2), (3), (4), and (5) each is mixed gas of $SF_6$ and $CO_2$ in 1:(48-52).

3. The preparation method of a rare earth magnesium alloy based on high-temperature and high-pressure hydrogenation according to claim 1, wherein in the step (4), the refining agent is JDMJ, and an amount of the refining agent is 1.5% to 2.5% of a total mass of the rare earth magnesium alloy based on high-temperature and high-pressure hydrogenation.

4. The preparation method of a rare earth magnesium alloy based on high-temperature and high-pressure hydrogenation according to claim 1, wherein in the step (4), the refining agent is added in three times at an interval of 2 min to 5 min under stirring.

* * * * *